United States Patent [19]

Gilson et al.

[11] Patent Number: 5,504,150
[45] Date of Patent: Apr. 2, 1996

[54] METHOD OF MAKING POLYSILOXANE EMULSIONS

[75] Inventors: Jean-Marc Gilson, Sombreffe, Belgium; Viken Kortian, Midland, Mich.; Didier P. G. Vanderveken, Brussels, Belgium

[73] Assignee: Dow Corning Corporation, Midland, Mich.

[21] Appl. No.: 417,350

[22] Filed: Apr. 5, 1995

[51] Int. Cl.$^6$ .................................................. C08L 83/00
[52] U.S. Cl. ............................................ 524/837; 524/588
[58] Field of Search ..................................... 524/588, 837

[56] References Cited

U.S. PATENT DOCUMENTS

| | | | |
|---|---|---|---|
| 3,094,497 | 6/1963 | Hyde | 260/18 |
| 3,160,601 | 12/1964 | Hyde | 260/46.5 |
| 3,839,388 | 10/1974 | Nitzsche | 260/448 |
| 4,123,403 | 10/1978 | Warner | 260/29 |
| 4,564,693 | 1/1986 | Riederer | 556/401 |
| 4,701,490 | 10/1987 | Burkhardt | 524/425 |
| 5,109,093 | 4/1992 | Rees | 528/14 |
| 5,319,120 | 6/1994 | Gilson | 556/453 |

*Primary Examiner*—Melvyn I. Marquis
*Attorney, Agent, or Firm*—James L. DeCesare

[57] ABSTRACT

Emulsions containing liquid polymers are made by first condensing monomers in a polymerization reactor having an inlet, a reaction chamber, and an outlet. The monomers are mixed with a condensation catalyst, and a pressurized gas forms a foaming mixture. The foaming mixture is fed down the chamber to the outlet while the monomers polymerize in the chamber. Water and a surfactant are then fed to the lower end of the chamber to form a water-in-oil emulsion with the aid of the foaming action in the chamber. A shear device then inverts the water-in-oil emulsion to an oil-in-water emulsion.

10 Claims, 1 Drawing Sheet

METHOD OF MAKING POLYSILOXANE EMULSIONS

BACKGROUND OF THE INVENTION

This invention is directed to a method of making emulsions, and more particularly to a method of making siloxane containing oil-in-water emulsions having an internal (discontinuous) phase viscosity ranging from 100–1,000,000 centistokes (mm$^2$/s).

U.S. Pat. No. 5,319,120 issued Jun. 7, 1994, and assigned to the assignee of the present invention, describes a reactor apparatus for making liquid polymers by condensing organosilicon monomers and oligomers. In the present invention, a similar apparatus is used to produce emulsions containing liquid polymers.

SUMMARY OF THE INVENTION

The invention relates to a polymerization reactor for making emulsions containing liquid silicone polymers. The reactor is used to carry out a process for making emulsions containing liquid polymers by condensing organosilicon compound monomers and/or oligomers. The polymerization reactor has an inlet, a reaction chamber, and an outlet. According to the process, organosilicon compound monomers and/or oligomers are mixed with a condensation catalyst. A pressurized gas is introduced causing the mixture to reach a foam-like consistency. The foaming mixture is fed down the reaction chamber towards the outlet, and the organosilicon compound monomers and/or oligomers are polymerized in the reaction chamber. Water containing a surfactant is fed to the lower end of the reaction chamber in order to form a water-in-oil emulsion containing the polymers. The water-in-oil emulsion is sheared and inverted to an oil-in-water emulsion containing the polymers as the internal phase.

Other features of the invention will become apparent from a consideration of the detailed description.

BRIEF DESCRIPTION OF THE DRAWING

The single drawing

DETAILED DESCRIPTION OF THE INVENTION

Figure 1:
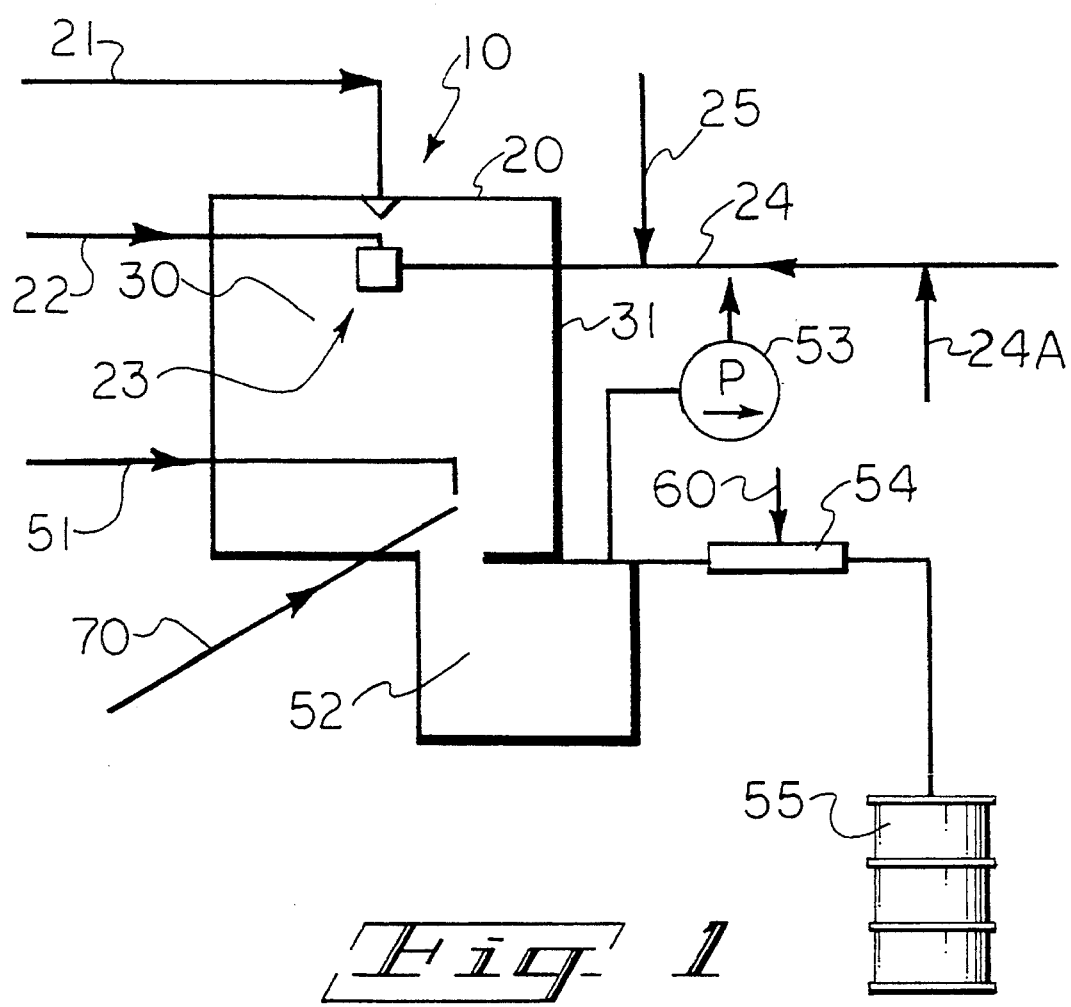
FIG. 1 is a pictorial representation of apparatus suitable for carrying out the method of the invention.

Emulsions are mixtures of at least two components which are substantially immiscible in each other, and a surfactant which lowers interfacial tension between the two phases. A microscopic view of aqueous emulsions reveals two phases, an oil phase and a water phase. Depending upon the proportion of each component, the emulsion can be characterized as an oil-in-water emulsion or a water-in-oil emulsion. The chief distinction between the two being which component (the oil or water) comprises the external (continuous) phase of the emulsion. The internal (discontinuous) phase is in the form of droplets in the other phase. Microemulsions are compositions in which the external phase of the emulsion contains an internal phase of droplets with an average diameter of less than about 140 nanometers (0.140 microns).

According to the present invention, oil-in-water emulsions are formed in conjunction with a static polymerization reactor for the production of liquid polymers. Downstream of the outlet of the reactor is provided a shear device in which a water-in-oil emulsion formed in the polymerization reactor is inverted to an oil-in-water emulsion.

The inlet of the polymerization reactor may be any convenient means of introducing a reaction mixture into the reactor. Preferably, the inlet is provided with a means for feeding reagents under pressure. For example, the inlet can be provided with a pumping system to feed the reaction mixture under pressure from a container placed at some distance from the inlet. Another method would be to feed under suction by means of a pump or siphon system, or simply feeding under gravity. The feeding means may be adapted to cause the reagents to pass through a heating mechanism which allows the reagents to be brought to higher temperatures such as the reaction temperature. The feeding means includes a mixing device for mixing the reagents and a catalyst in the right proportions. Less preferred is feeding the reaction mixture into the reaction chamber through the inlet by being sucked through the reaction chamber using reduced pressure on the outlet.

In the preferred method, the reaction mixture is mixed with a pressurized gas at the inlet, and the gas is used to force the reaction mixture through the reaction chamber of the polymerization reactor. The pressurized gas may be any inert gas such as air or nitrogen. The mixing of the gas with the reaction mixture is effected in a way causing the reaction mixture to reach a foam-like consistency. A large air liquid interface is created making the system especially useful for condensation polymerization reactions in which water or another simple material is formed as a by-product of the reaction of two monomers or oligomers.

The inlet includes an atomizer. Where pressurized gas at a pressure greater than 40 psi (275 kPa) is used, some of the gas may be employed to aid atomization of the reaction mixture. The mixture may be atomized by conventional means including pressurizing the reaction mixture through the atomizing device causing it to form a spray of small particles. An alternative method is the use of a pressurized gas such as compressed air or nitrogen at a pressure greater than 40 psi (275 kPa) to atomize the reaction mixture when it passes through the device. There can also be used a rotary atomizer which causes the reaction mixture to form small droplets by feeding it onto a rotating plate. The pressurized gas and the narrowness of the reaction chamber into which the mixture is fed causes the composition to reach a foam-like consistency in which all ingredients are well dispersed and mixed. Efficient mixing is important where small amounts of catalyst are used in the polymerization reaction. The reaction mixture is brought to an increased temperature by heating the mixture itself prior to the inlet, or the mixture may be heated by using heated pressurized gas or heating the reaction chamber into which the mixture is fed.

The reaction chamber is elongated and hollow to receive the reaction mixture. It is preferred that the reaction chamber be cylindrical in shape although this is not necessary. Cylindrical chambers are easier to manufacture and have a geometry which is more favorable for good mixing by eliminating any possible dead space. The length of the chamber in the direction of flow of the reaction mixture should be at least twice the diameter of the chamber at its widest point. Preferably the diameter of the reaction chamber is 2–25 centimeters preferably 5–10 centimeters. Larger diameters are possible but are only efficient if sufficient reaction mixture is provided to cause sufficient flow in the reactor to ensure efficient mixing and heat transfer in the reaction mixture. Adequate rates for large diameters are impractical in most cases. The length of the reaction chamber depends on the flow rate of the reaction mixture, the efficiency of the catalyst, and other rate determining factors. A suitable length for the reactor chamber is 25 centimeters to 100 meters, but preferably 50 centimeters to 40 meters, and most preferably 2–25 meters. Preferred is a reaction chamber of such dimensions that the reaction mixture will have a residence time in the reaction chamber of less than 5 minutes and preferably less than 2 minutes. A particularly useful reaction chamber for the production of up to 200 kilograms of polymer per hour would be about 8 meters in length with an internal diameter of about 5 centimeters. The chamber may be an elongated straight tube or it may be coiled or shaped in another way. A coiled reaction chamber has the advantage of reducing the required overall length or height of the reactor.

Because of the mixing or atomizing system used to feed the reaction mixture into the reaction chamber, and the use of pressurized gas to force the mixture through the reactor, sufficient turbulence is created to ensure efficient polymerization of the monomers and/or the oligomers.

The polymerization reactor has an outlet which is most suitably the open end of the reaction chamber. There the polymerized liquid material in the form of a water-in-oil emulsion may be collected immediately in a suitable receptacle such as a tank or drum. It is preferred however to pass the water-in-oil emulsion containing the polymer through a de-aeration system before inverting the emulsion, especially where the mixture has reached a foam-like consistency. To neutralize the catalyst, a feed duct is provided into which a neutralization agent is added and mixed at an appropriate ratio. A cooling system may also be installed at or near the collection point in order to bring the emulsion to the desired temperature. A filtration system may be employed to filter out any salts formed by neutralization of the catalyst, and the filtration system can be installed before the cooling device since it is easier to filter hot liquids with lower viscosities.

According to the invention there is provided a process for producing emulsions containing liquid polymers by condensing monomers and/or oligomers in a polymerization reactor. Use of the term "liquid" in relation to polymers, monomers, or oligomers denotes materials having a consistency allowing them to flow at a temperature of 25° C. and which adapt to the shape of the receptacle in which they are placed when submitted to a pressure, e.g. gravity. The term excludes materials clearly solid or gaseous and materials which are thermoplastic. Thus, the term "liquid polymers" includes apart from low viscosity polymers having a viscosity of 20 mm²/s, those polymers which have a high viscosity such as gums, loosely crosslinked materials, and certain gels which flow under pressure.

The process is limited to polymers made by the condensation reaction of monomers and/or oligomers. By condensation is meant a chemical reaction in which two or more molecules combine with the separation of water or some other simple substance as defined in ASTM D883-54T. The process of the invention is particularly useful for condensation polymerization because a large surface area is created at the gas-liquid interface. This encourages the by-product of the condensation reaction (water) to migrate into the gas phase, especially when the temperature in the reaction chamber is sufficiently high to volatilize the by-product. A condensation polymerization reaction suitable for the process of the invention is the formation of polysiloxane materials by condensation of organosilicon compounds having silanol groups (≡SiOH).

The process of the invention is particularly preferred in the manufacture of oil-in-water emulsions containing organosiloxane materials made by polymerization of organosilicon compounds having silicon-bonded —OR radicals in which R is a hydrogen atom or lower alkyl group having one to six carbon atoms provided at least some R groups are hydrogen atoms. It is most preferred that each R group be hydrogen.

Organosilicon compounds used as monomers or oligomers in the process of the invention may be organosilanes, organosiloxanes, silcarbanes, or mixtures. Silicon-bonded organic substituents in the organosilicon compound can be monovalent hydrocarbon groups having 1–14 carbon atoms such as alkyl, aryl, aralkyl, alkaryl, or alkenyl groups; monovalent substituted hydrocarbon groups having 1–10 carbon atoms such as amino-substituted alkyl or aryl groups, mercaptoalkyl groups, haloalkyl groups, esterified carboxyalkyl groups, polyoxyalkylene groups, and hydroxyalkyl groups. Examples of suitable organic substituents which may be present in the organosilicon compounds are methyl, ethyl, propyl, hexyl, dodecyl, tetradecyl, phenyl, xylyl, tolyl, phenylethyl, vinyl, allyl, hexenyl, —R'NH₂, —R'NHCH₂CH₂NH₂, —R'SH, —R'Br, —R'Cl, and R'OH. R' is a divalent organic group having less than 8 carbon atoms such as —(CH₂)₃—; —CH₂CHCH₃CH₂—; arylene —C₆H₄— or aralkylene —(C₆H₃CH₃)—. For commercial applications at least 50% of the organic substituents should be methyl groups with remaining groups being vinyl or phenyl groups. Preferably 80% of all organic substituents are methyl groups.

Although the organosilicon compounds may have a number of silicon-bonded groups —OR per molecule, it is preferred that no more than two —OR groups be present on each molecule. This encourages formation of substantially linear polysiloxane materials. Preferred organosilicon compounds are short-chain linear polydiorganosiloxane materials having silanol end-groups. These materials have the formula:

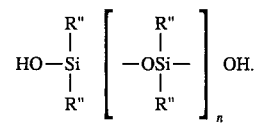

In the formula, each R" is an organic group as described above, and n is an integer having a value of no more than about 300. Siloxane polymers are oligomers for purposes of the invention as long as they have a shorter siloxane chain length than the final product obtained by the process of the invention. Preferred polydiorganosiloxanes each have an R" which is methyl, n is 10–300, more preferably 50–150, and most preferably 75–100. Such polydiorganosiloxanes are produced by hydrolysis and condensation of dihalodiorganosilanes and are available commercially.

In the process of the invention, emulsions containing silanol end-blocked polydiorganosiloxanes of high viscosity may be produced. If desired, however, the condensation products in the emulsions may be end-blocked with triorganosiloxy units. One method of effecting such end-blocking comprises incorporating a triorganoalkoxy silane or a triorganosilanol in the reaction mixture. A more preferred method of producing triorganosiloxy end-blocked polydiorganosiloxanes comprises the incorporation of polydiorganosiloxane materials end-blocked with a triorganosiloxane group at one end and a hydroxyldiorganosiloxane group at the other. An alternative way is the use of lower molecular weight polydiorganosiloxanes having triorganosiloxane end groups. This usually requires use of a catalyst which has some activity in breaking of the siloxane Si—O—Si bond. Yet another alternative is the use of a silazane such as hexamethyldisilazane. Suitable triorganosiloxane end-blocking units include trimethylsiloxane, triethylsiloxane, dimethylvinylsiloxane, and dimethylphenylsiloxane.

The process of the invention is suitable for preparation of emulsions containing a variety of organosilicon products made by a condensation reaction. If desired there may be included with the organosilicon compound other organosilicon compounds such as alkoxysilanes which are reactive with the silanol-containing reagent or condensation products to provide organofunctional or chain terminating groups. Examples of such silanes are trimethyl methoxy silane, methyl phenyl dimethoxy silane, methyl phenyl vinyl ethoxysilane, and aminopropyl trimethoxy silane.

The process of the invention involves contacting organosilicon compounds which are monomers or oligomers with a catalyst at a temperature at which the desired rate of polymerization occurs. The temperature employed should be in the range of 30°–300° C. Reactions at lower temperatures are normally too slow to be of commercial value. More preferably the polymerization reaction is carried out at a temperature of 50°–200° C., most preferably 70°–170° C.

Sufficient catalyst is employed to achieve the desired rate of condensation. This is determined by the nature and geometry of the processing equipment, the temperature of the process, and other factors such as the residence time of the reaction mixture in the reaction chamber. In most cases however there can be employed 0.001–5% by weight of the catalyst based on the weight of the organosilicon compounds in the reaction mixture.

Catalysts most preferred according to this invention are condensation specific catalysts based on phosphonitrile chloride, such as those prepared according to U.S. Pat. Nos. 3,839,388; 4,564,693; or 4,701,490; and phosphonitrile halide catalysts $\{X(PX_2=N)_nPX_3\}^+\{MX_{(v-t+1)}R'_t\}^-$. In the formula, X is a halogen atom; M is an element having an electronegativity of 1.0 to 2.0 according to Pauling's scale; R' is an alkyl group having 1–12 carbon atoms; n has a value of 1–6; v is the valence or oxidation state of M; and t has a value of 0 to v–1.

Other condensation specific catalysts can be used however, such as dodecylbenzene sulphonic acid; n-hexylamine; tetramethylguanidine; carboxylates of rubidium or cesium; hydroxides of magnesium, calcium, or strontium; and other catalysts as are mentioned in the art such as in U.S. Pat. Nos. 3,094,497; 3,160,601; and 5,109,093.

Termination of the polymerization reaction is achieved by conventional methods. For example, the temperature of the reaction mixture may be lowered beyond the point where the catalyst is active. Alternatively, the reaction mixture may be heated to a point where the catalyst is inactivated, e.g. by decomposition, provided the polymer is not affected by such action. Yet another procedure is the introduction of an inactivation agent when the polymer has reached its desired degree of polymerization. This can be achieved by using a stoichiometric excess of water, optionally containing amine neutralization agents such as ethylene diamine and trihexylamine.

The condensation polymers vary in viscosity depending on polymerization circumstances. The process according to the invention is capable of producing high viscosity polymers of 1,000,000 mm$^2$/s or more, but preferably up to about 500,000 mm$^2$/s. Oil-in-water emulsions containing these polymers are useful in such applications as treatment of textiles to impart water repellency, paper coatings to impart high release surfaces, and as a polishing agent for hard surfaces.

One or more surfactants are used in forming the emulsion, and any type of nonionic or ionic emulsifying agent, or a mixture of nonionic and ionic emulsifying agents, can be employed. Among the nonionic surfactants suitable are ethoxylated fatty alcohols. Such fatty alcohol ethoxylates contain in their molecule the characteristic —(OCH$_2$CH$_2$)$_a$OH group which is attached to a fatty hydrocarbon residue of 8–20 carbon atoms such as lauryl (C$_{12}$), cetyl (C$_{16}$) and stearyl (C$_{18}$). The integer "a" can have a value of 1–100 but typically it is 12–40. Commercial products include polyoxyethylene fatty alcohols sold under the tradename BRIJ by ICI Americas Incorporated, Wilmington, Del.; the tradename EMERY by the Henkel Corporation/Emery Group, Ambler, Pa.; the trademark ETHOSPERSE® by Lonza Incorporated, Fairlawn, N.J.; and the trademark PROMULGEN® by the Amerchol Corporation, Edison, N.J. One such nonionic surfactant is BRIJ 35 Liquid. This polyoxyethylene (23) lauryl ether has an HLB value of about 16.9 and the formula C$_{12}$H$_{25}$(OCH$_2$CH$_2$)$_{23}$OH.

Other useful polyoxyethylene fatty alcohols are polyoxyethylene (4) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, polyoxyethylene (10) oleyl ether, and polyoxyethylene (20) oleyl ether. Additional nonionic surfactants are ethoxylated alcohols or ethoxylated alkyl phenols sold under the trademarks TERGITOL® and TRITON® by Union Carbide Corporation, Danbury, Conn.; NEODOL® by Shell Chemical Company, Houston, Tex.; MACOL® by PPG Industries, Gurnee, Ill.; and under the tradenames TRYCOL by Henkel Corporation, Ambler, Pa.; and BRIJ by ICI Americas Incorporated, Wilmington, Del. Especially preferred is TERGITOL® TMN-6 available as a concentrated 90% solution with an HLB of 11.7.

In addition, other nonionic surfactants can be used such as fatty acid alkanolamides or amine oxides. Fatty acid alkanolamides are nonionic surfactants obtained by reacting alkanolamines such as monoethanolamine, diethanolamine, monoisopropanolamine, or diisopropanolamine, with a fatty acid or fatty acid ester to form the amide. The hydrophobic portion of the nonionic surfactant is provided by a fatty acid hydrocarbon chain which generally has 10–21 carbon atoms. The fatty acid alkanolamide surfactants include fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide. A representative nonionic surfactant is a product sold under the trademark WITCAMIDE® by Witco Corporation, New York, N.Y.

Amine oxides are nonionic surfactants obtained by oxidizing a tertiary amine to form the amine oxide. Amine oxide surfactants include N-alkyl amine oxides such as N-cocodimethylamine oxide, N-lauryl dimethylamine oxide, N-myristyl dimethylamine oxide, and N-stearyl dimethylamine oxide; N-acyl amine oxides such as N-cocamidopropyl dimethylamine oxide and N-tallowamidopropyl dimethylamine oxide; and N-alkoxyalkyl amine oxides such as bis(2-hydroxyethyl) $C_{12-15}$ alkoxy-propylamine oxide. The hydrophobic portion of the amine oxide surfactants is generally provided by a fatty hydrocarbon chain containing 10–21 carbon atoms.

Representative amine oxide surfactants include lauric acid diethanolamide, N-lauryl dimethylamine oxide, coconut acid diethanolamide, myristic acid diethanolamide, and oleic acid diethanolamide. Suitable commercial products are sold under tradenames and trademarks such as AMMONYX by the Stephan Company, Northfield, Ill.; BARLOX® by Lonza Incorporated, Fairlawn, N.J.; and MACKAMINE by The Mcintyre Group Limited, University Park, Ill. Sorbitan derivatives sold under the tradenames SPAN and TWEEN by ICI Americas Incorporated, Wilmington, Del.; and propylene oxide-ethylene oxide block polymers sold under the trademark PLURONIC® by BASF Corporation, Parsippany, N.J.; may also be employed.

Useful ionic surfactants include anionic, amphoteric (ampholytic), or cationic emulsifying agents. Suitable anionic surfactants include sulfonated and sulfated alkyl, aralkyl and alkaryl anionic surfactants; alkyl succinates; alkyl sulfosuccinates and N-alkyl sarcosinates. Representative surfactants are the sodium, magnesium, ammonium, and the mono-, di- and triethanolamine salts of alkyl and aralkyl sulfates, as well as the salts of alkaryl sulfonates. The alkyl groups of the surfactants generally have a total of 12–21 carbon atoms, may be unsaturated, and are preferably fatty alkyl groups. The sulfates may be sulfate ethers containing 1–10 ethylene oxide or propylene oxide units per molecule. Preferably, the sulfate ethers contain 2–3 ethylene oxide units.

Representative anionic surfactants include sodium lauryl sulfate, sodium lauryl ether sulfate, ammonium lauryl sulfate, triethanolamine lauryl sulfate, sodium C14–16 olefin sulfonate, ammonium pareth-25 sulfate, sodium myristyl ether sulfate, ammonium lauryl ether sulfate, disodium monooleamido sulfosuccinate, ammonium lauryl sulfosuccinate, sodium dodecylbenzene sulfonate, triethanolamine dodecylbenzene sulfonate, and sodium N-lauroyl sarcosinate.

Suitable anionic surfactants are products sold under tradenames or trademarks such as EMCOL® and WITCONATE® by Witco Corporation, New York, N.Y.; MARLON by Huls America Incorporated, Piscataway, N.J.; AEROSOL by American Cyanamid Company, Wayne, N.J.; and HAMPOSYL by W. R. Grace & Company, Lexington, Mass. There may also be employed sulfates of ethoxylated alcohols sold under the tradename STANDAPOL by Henkel Corporation, Ambler, Pa. An especially useful anionic surfactant is the sodium salt of an alkylaryl polyether sulfate sold under the trademark TRITON® W-30 CONC by Union Carbide Corporation, Danbury, Conn.

Amphoteric or ampholytic surfactants include cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine.
Other amphoteric surfactants include quaternary cycloimidates, betaines, and sultaines. Betaines have the structure $R^1R^2R^3N^+(CH_2)_mCOO^-$ in which $R^1$ is an alkyl group having 12–18 carbon atoms or a mixture thereof; $R^2$ and $R^3$ are independently lower alkyl groups having 1–3 carbon atoms; and m has a value of 1–4. Specific betaines are alpha-(tetradecyldimethylammonio)acetate, beta-(hexadecyldiethylammonio)propionate, and gamma-(dodecyldimethylammonio)butyrate. Sultaines have the structure $R^1R^2R^3N^+(CH_2)_mSO_3^-$ in which $R^1$, $R^2$, $R^3$, and m, are as defined above. Specific useful sultaines are 3-(dodecyldimethylammonio)-propane-1-sulfonate, and 3-(tetradecyldimethylammonio)ethane-1-sulfonate. Representative amphoteric surfactants are sold under tradenames or trademarks such as MIRATAINE® by Rhone-Poulenc Incorporated, Cranberry, N.J.; and TEGO BETAINE by Goldschmidt Chemical Corporation, Hopewell, Va. Imidazoline and imidazoline derivatives sold under the trademark MIRANOL® by Rhone-Poulenc Incorporated, Cranberry, N.J., may also be employed.

Useful cationic surfactants include compounds containing amino or quaternary ammonium hydrophilic moieties in the molecule and which are positively charged such as quaternary ammonium salts. Representative quaternary ammonium salts are ditallowdimethyl ammonium chloride, ditallowdimethyl ammonium methyl sulfate, dihexadecyl dimethyl ammonium chloride, di(hydrogenated tallow)dimethyl ammonium chloride, dioctadecyl dimethyl ammonium chloride, dieicosyl dimethyl ammonium chloride, didocosyl dimethyl ammonium chloride, di(hydrogenated tallow) dimethyl ammonium acetate, dihexadecyl dimethyl ammonium acetate, ditallow dipropyl ammonium phosphate, ditallow dimethyl ammonium nitrate, di(coconutalkyl)dimethyl ammonium chloride, and stearyl dimethyl benzyl ammonium chloride. Suitable cationic surfactants are sold under tradenames or trademarks such as ADOGEN by Sherex Chemical Company Incorporated, Dublin, Ohio; EMCOL® by Witco Corporation, New York, N.Y.; TOMAH by Tomah Products Incorporated, Milton, Wis.; and ARQUAD and ETHOQUAD by Akzo Chemicals Incorporated, Chicago, Ill. One useful cationic surfactant is the N-alkyl-trimethyl ammonium chloride sold as ARQUAD T-27W by Akzo.

There now follows a description of the reactor shown in FIG. 1. Reactor 10 include inlet 20, reactor wall 31 forming reaction chamber 30, and an outlet in communication with tank 52. Inlet 20 includes compressed air line 21 for supplying hot compressed air from a compressor (not shown) via a heat exchanger (also not shown). A second compressed air line 22 is connected to atomizing device 23. Atomizing device 23 has a supply line 24 feeding reaction mixture to the atomizing device 23, and another supply line including a device 25 for introducing catalyst and mixing the catalyst with reaction mixture in line 24 in the required proportions. Supply line 24A communicates with reaction mixture supply line 24 for adding endblocking units when required.

The reaction chamber 30 can have an internal diameter of about 30–100 millimeters and a total length of about 4,000–15,000 millimeters. Reactor wall 31 has inlet 51 for supplying a neutralization agent into chamber 30. The bottom of reaction chamber 30 is open and communicates with deaeration tank 52. Tanks 52 has an extraction system 53 for removing air. The water-in-oil emulsion which accumulates in tank 52 is conveyed continuously or semicontinuously to a shear device 54, and the resulting product is fed to a drum 55. The water-in-oil emulsion in tank 52 is sheared and converted to an oil-in-water emulsion in device 54. Any type of shear device 54 can be used such as an Eppenbach colloid mill, a Sonolator ultrasonic homogenizer, a Neulinger-type planetary change-can mixer, or a continuous variable shear mixer of the type described in U.S. Pat. No. 4,123,403. For continuous operation, a device as described in U.S. Pat. No. 4,123,403 is most preferred. For semi-continuous operation, a change-can mixer is most preferred. An inlet 70 introduces water and one or more surfactants into the lower end of reaction chamber 30, and the device 54 includes an inlet 60 for supplying additional water, if necessary.

In using the apparatus shown in FIG. 1 to carry out the method of the invention, a catalyst 25, monomers and/or oligomers 24, and endblocking units 24A, are mixed and fed into atomizer 23 with compressed air 22. Heated compressed air 21 forces the atomized mixture to foam, and pushes the foamed mixture down reaction chamber 30 towards outlet tank 52. At the lower end of reactor 10, the foam-like mixture is neutralized with water introduced at 51. Additional water and the surfactant(s) used to form the water-in-oil emulsion are fed via line 70 to the chamber 30. Air is removed at 53. The water-in-oil emulsion is sheared in device 54 and collected in drum 55. The adding of water at 51, 60, and 70, maintains the temperature of the mixture below the degradation temperature of any surfactant(s) fed into the chamber at inlet 70. While the temperature in reaction chamber 30 above inlet 51 is usually about 150°–160° C., the temperature of the mixture after adding water at inlet 70 is lowered to about 70°–90° C. More water can then be added at 60 to further lower the temperature to about 30°–50° C. in shear device 54 to prevent evaporation loss.

The content of the final product will determine the exact amounts of water and surfactant(s) to be used in the process. For example, a 50% silicone emulsion can be made by using enough water and surfactant such that drum 55 will contain 50% of siloxane polymer, 48% water, and 2% surfactant(s) including any water added at inlets 51 and 60. In general however, there can be used 50–80 percent by weight of water and 2–15 percent by weight of surfactant(s).

EXAMPLE

The apparatus in FIG. 1 was used in three separate polymerization runs (Ex.1–3) to make emulsions containing siloxane materials. The reactor 30 had a length from the point where the reagents were injected to the outlet of about 15 meters. The reaction conditions during each run were allowed to settle before any results were measured. Airflow through line 21 was 200 m³/h at a pressure greater than 40 psi (275 kPa). The air was heated to about 170° C. The flow of cold air through line 22 was 20 m³/h at a pressure greater than 40 psi (275 kPa) in order to atomize the monomer fed through line 24. The monomer used in these three examples was a α,w-hydroxyl endblocked polydimethylsiloxane oligomer with a viscosity of 100 mm²/s. As shown in Table I, the monomer was fed at varying rates and temperatures. Two trimethylsilyl-terminated polydimethylsiloxane fluids (PDMS) with a viscosity of 10 and 50 mm²/s were used to provide endlocking units 24A. The catalyst, an antimony derivative of phosphonitrile chloride, was supplied as a 40 grams per liter solution in $CH_2Cl_2$. It was neutralized at 51 with water. A solution containing 2 percent by weight of two surfactants in water was used ("Surfactant Rate kg/h"). One surfactant was a concentrated 90% solution of TERGITOL® TMN-6, and the other surfactant was a 27% aqueous solution of TRITON® W-30 CONC, in a ratio of about 4:1 respectively, based upon the weight of the solutions. The content of tank 52 was transferred to a five liter vacuum-operated NEULINGER RDH change-can mixer 54 and mixed for about 10 minutes using a scraper blade speed of 40 rpm (0.42 rad/s) and an impeller (dissolver) blade speed of 4,000 rpm (42 rad/s). Dilution water 60 was added during mixing to reduce the nonvolatile content to 60–65%. Particle size distribution measurements were made for each oil-in-water emulsion and are shown in Table II. "D" in Table II is the particle diameter in microns "v" is a percent distribution in the emulsion of particles of a given size. These measurements were made with a MALVERN MASTERSIZER having a focal length of 45 millimeters and a beam length of 2.4 millimeters.

TABLE I

| FIG. 1/Conditions | EXAMPLES | | |
|---|---|---|---|
| | Ex. 1 | Ex. 2 | Ex. 3 |
| (24) Monomer Rate kg/h | 85.5 | 97 | 98.5 |
| (24) Monomer Temp °C. | 155.1 | 140 | 140 |
| (25) Catalyst Rate ml/min | 0.4 | 0.4 | 0.4 |
| (24A) Endblocker Rate kg/h | | | |
| 1. 10 cs. PDMS | 15.2 | — | — |
| 2. 50 cs. PDMS | — | 4.1 | 1.3 |
| (21) Hot Air Rate m³/h | 200 | 200 | 200 |
| (22) Cold Air Rate m³/h | 20 | 20 | 20 |
| (55) Polymer Viscosity mPa.s | 314 | 31,000 | 180,000 |
| (51) Water Rate kg/h | 26 | 10.8 | 14.3 |
| (70) Surfactant Rate kg/h | 7.8 | 7.8 | 7.8 |
| (52) Outlet Temp. °C. | 80 | 80 | 80 |
| (52) Non-volatile content % | 88 | 94.5 | 94.5 |

TABLE II

| | Particle Diameter (D) and Percent Distribution (v) | | |
|---|---|---|---|
| Example | D (v = 10%) | D (v = 50%) | D (v = 90%) |
| 1 | 0.22 | 0.51 | 0.94 |
| 2 | 0.18 | 0.35 | 0.79 |
| 3 | 0.31 | 0.68 | 1.83 |

Table II shows that the emulsions contained particles of siloxane polymer with diameters varying overall from 0.18–1.83 microns (180–1,183 nanometers), and that the diameters in separate emulsions was 0.18–0.79 microns (180–790 nanometers); 0.22–0.94 microns (220–940 nanometers); and 0.31–1.83 microns (310–1,183 nanometers), respectively.

Other variations and modifications may be made in the method described above without departing from the essential features of the invention. The forms of the invention described are only exemplary and not intended as limitations on the scope of the invention defined in the claims.

That which is claimed is:

1. A process for making emulsions containing liquid polymers by condensing organosilicon compounds in a polymerization reactor having an inlet, a reaction chamber having a lower portion, and an outlet, comprising mixing the compounds with 0.001–5% by weight of a condensation catalyst based on the weight of the compounds in the resulting mixture, mixing the compounds and the catalyst with a pressurized gas to cause foaming and the mixture to reach a foam-like consistency, feeding the foaming mixture down the chamber towards the outlet, forming liquid polymers in the chamber by allowing the compounds to polymerize in the chamber, after polymerizing the compounds feeding water and a surfactant to the chamber, mixing and dispersing the mixture with the foaming in the chamber to form a water-in-oil emulsion containing the polymers, collecting the emulsion at the outlet of the reactor, and inverting the emulsion by shearing to an oil-in-water emulsion containing the polymers as the internal phase.

2. A process according to claim 1 wherein the compounds have silicon bonded —OR groups in which R is selected from the group consisting of hydrogen and lower alkyl groups having 1–6 carbon atoms, provided at least some R groups are hydrogen.

3. A process according to claim 2 wherein the compounds are α,w-hydroxyl endblocked polydimethylsiloxanes.

4. A process according to claim 1 wherein the condensation catalyst is a phosphonitrile halide having the formula $\{X(PX_2=N)_nPX_3\}^+\{MX_{(v-t+1)}R'_t\}^-$ in which X is a halogen atom; M is an element having an electronegativity of 1.0 to 2.0 according to Pauling's scale; R' is an alkyl group having 1-12 carbon atoms; n has a value of 1-6; v is the valence or oxidation state of M; and t has a value of 0 to v-1.

5. A process according to claim 1 wherein the surfactant is selected from the group consisting of nonionic, anionic, amphoteric, and cationic emulsifying agents, and mixtures thereof.

6. A process according to claim 5 wherein the surfactant is a mixture of nonionic and anionic emulsifying agent in a ratio of about 4:1.

7. A process according to claim 1 wherein the polymerization reaction is carried out at a temperature of 30°–300° C. in the chamber, the temperature in the lower portion of the chamber is maintained at about 70°–90° C., and the temperature during inversion is lowered to 30°–50° C.

8. A process according to claims 7 wherein the oil-in-water emulsion contains particles of the polymer with diameters ranging from 0.18–1.83 microns (180–1,183 nanometers).

9. A process according to claim 8 wherein the oil-in-water emulsion contains particles of the polymer with diameters in ranges selected from the group consisting of 0.18–0.79 microns (180–790 nanometers), 0.22–0.94 microns (220–940 nanometers), and 0.31–1.83 microns (310–1,183 nanometers).

10. A process according to claim 9 wherein the oil-in-water emulsion contains 50–80 percent by weight of water, 2–15 percent by weight of surfactant, and the remainder being the polymer.

* * * * *